Oct. 28, 1969  H. J. JACOB, JR  3,474,705

TOOL SPINDLE MECHANISM

Filed Sept. 19, 1966  2 Sheets-Sheet 1

INVENTOR.
HARRY J. JACOB, JR.

BY Hoffmann and Yount

ATTORNEYS

Oct. 28, 1969    H. J. JACOB, JR    3,474,705
TOOL SPINDLE MECHANISM
Filed Sept. 19, 1966    2 Sheets-Sheet 2

INVENTOR
HARRY J. JACOB, JR.

BY Hoffmann and Yount
ATTORNEYS 3,474,705
TOOL SPINDLE MECHANISM
Harry J. Jacob, Jr., South Russell, Ohio, assignor to The Warner & Swasey Company, Cleveland, Ohio, a corporation of Ohio
Filed Sept. 19, 1966, Ser. No. 580,439
Int. Cl. B23c 7/00
U.S. Cl. 90—11                    11 Claims

ABSTRACT OF THE DISCLOSURE

A collet and drawbar mechanism in a machine tool in which the collet device has spring means urging its locking elements to a closed position for gripping the tool holder in all positions of the collet device longitudinally of the spindle. The drawbar has a forwardly-facing shoulder which engages the back ends of the locking elements of the collet device for moving them forward to a position permitting the forceable withdrawal or insertion of the tool holder. The drawbar has a lost-motion connection to the collet device for retracting it.

---

The present invention relates to a machine tool, and more particularly to a machine tool having a rotatable spindle and mechanism in the spindle for gripping and drawing into, and unseating from, the spindle a tool holder.

In machine tools, such as horizontal boring, drilling and milling machines, a tool such as a boring tool is held by a tool holding device, commonly called a tool arbor which is received in a recess or socket in the spindle. The spindle conventionally has a drawback mechanism for drawing the tool arbor tightly into the socket and locking the arbor in the socket during the machining operation. When the tool is to be changed, the drawback mechanism is operated to unlock the tool arbor and to unseat the same from the socket.

An important object of the present invention is to provide a new and improved machine tool having a machine tool spindle and tool gripping device positioned therein which is movable from a forward tool release position in which the device is adapted to receive and release the tool to a rearward locking position in which a tool gripped by the device is locked in the spindle, the device being so constructed and arranged that it maintains a grip for holding the tool in the spindle socket after it has been returned to its forward position to unseat the tool and to position the device to allow the tool to be withdrawn therefrom. In the preferred embodiment, the tool gripping device is a collet device which is biased to a closed position so that it grips and holds the tool when the device is in its forward position until the tool is forceably withdrawn from the collet device by a force which overcomes the bias tending to hold the collet device closed.

A further object of the present invention is to provide in a machine tool having a rotatable spindle, a new and improved collet and drawback mechanism for seating and locking a tool in the spindle which includes a reciprocable power driven member for moving a collet device for gripping the tool between locking and releasing positions with the member having a first driving position relative to the collet device for moving the collet device forwardly relative to the tool and spindle toward its release position and in which the member engages and moves the tool with the collet device after a predetermined movement of the latter and a second driving position relative to the collet device rearwardly of the first for moving the mechanism rearwardly to a locking position to seat and lock a tool in the spindle.

A still further object of the present invention is to provide in a machine tool having a rotatable spindle a new and improved mechanism for drawing a tool into a socket in the spindle, locking the tool in the spindle during the machining operation and for unseating and releasing the tool when the tool is to be changed, the mechanism being so constructed and arranged that when positioned to release a tool, the mechanism maintains a grip on the tool to prevent it from being dropped accidentally.

A further object is to provide a new and improved machine tool having a rotatable machine tool spindle which incorporates a novel drawbar mechanism for seating, locking, and unseating a tool holder, which mechanism is simple and reliable in operation.

Further objects and advantages of the present invention will be apparent from the following detail description thereof made with reference to the accompanying drawings forming a part of the present specification for all subject matter disclosed therein and in which.

Figure 1:
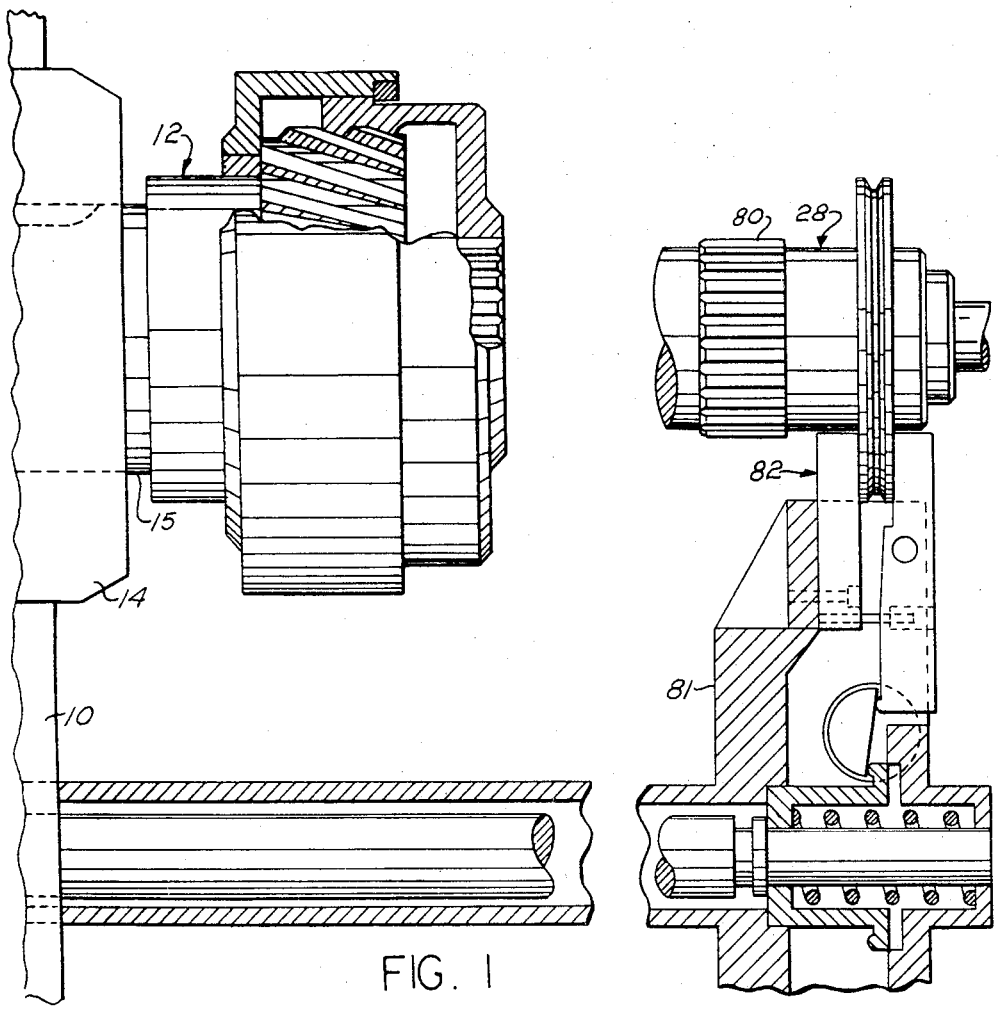
FIG. 1 is a fragmentary showing of a machine tool embodying the present invention.

Referring to the drawings, the present invention is there shown as embodied in a machine tool 10. The machine tool 10 may be of any suitable type, such as a conventional boring, milling and drilling machine and may have an automatic tool changer or mechanism for effecting tool changes. Since a detailed illustration and description of the overall boring, milling and drilling machine and tool changer is not necessary in order to obtain a clear understanding of the present invention, only those parts which are necessary to carry out the provisions of the present invention have been illustrated in the drawings and will be described herein.

The boring, drilling and milling machine embodying the present invention includes a spindle means 12 supported within a spindle housing 14 for rotational and longitudinal movement relative thereto. The spindle means 12 comprises a spindle 15 which is slidably keyed within a coaxial spindle quill 16, which in turn is rotatably supported within the spindle housing 14 by suitable bearings, not shown. The machine tool includes a suitable or conventional electric or hydraulic motor and change speed transmission (not shown) operatively connected to the spindle quill 16 for rotating the same and hence, the spindle 15 at variable speeds.

Figure 2:
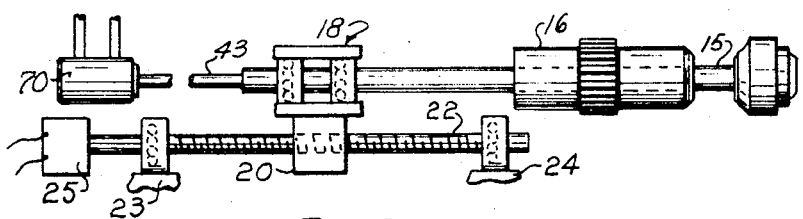
FIG. 2 is a diagrammatic showing of the mechanism for moving the spindle of the machine tool shown in FIG. 1 axially.
Figure 3:
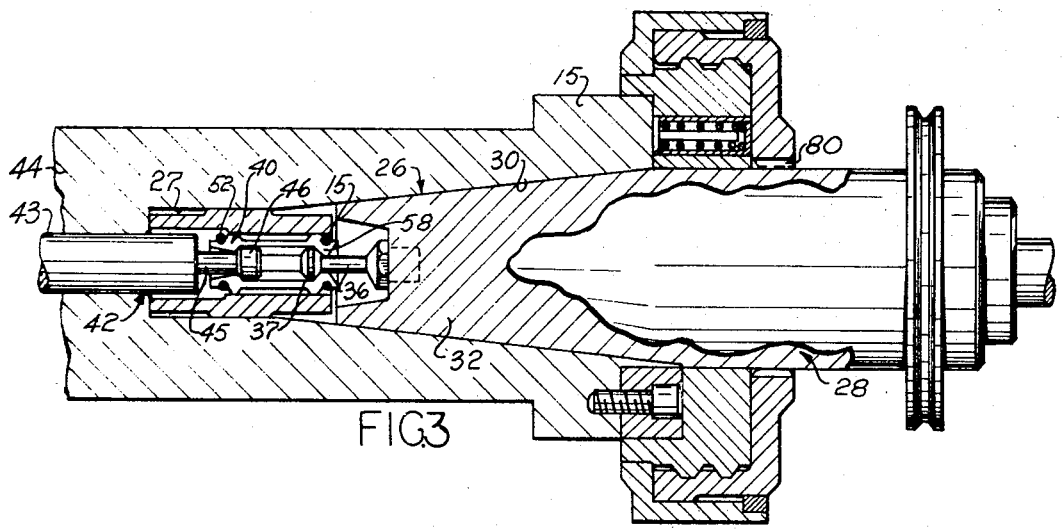
FIG. 3 is a cross-sectional view through the spindle of the machine of FIG. 1.

As schematically shown in FIG. 2, the inner end of spindle 15 is journaled in a conventional bearing means 18 which is constrained against axial movement relative to the spindle but which is movable in a direction axially of the spindle relative to the frame of the machine. The bearing means 18 includes a nut 20 threadably engaged with a feed screw 22. The feed screw 22 is rotatably supported by suitable bearings 23, 24 at its ends within the spindle head 14 and is adapted to be rotated in either direction by a suitable or conventional drive means 25, such as an electric or hydraulic motor. It is apparent from the above, that when the drive means 25 is energized to rotate the feed screw 22, the nut 20 is caused to be moved axially therealong. Movement of the nut 20 along the feed screw 22 causes the bearing means 18 and, in turn, the spindle 15 to move axially relative to the quill 16 and the spindle housing 14.

The spindle 15 at its outer end has a tapered socket in the form of an axially extending opening 26 which is adapted to receive a tool holder or arbor 28 carrying a tool for performing work on a workpiece. The socket 26 is here shown as having a cylindrical inner end portion 27 and a frusto-conically tapered outer end portion 30 which is adapted to be engaged by a complementary frusto-conical tapered shank portion 32 of the tool holder 28 when the latter is received in the socket 26. The tool holder 28 includes an axially extending adapter 36 having one end threadably connected with the inner end of the shank portion 32 and the opposite end provided with a plug or head 37.

The plug 37 of the tool holder 28, when the latter is received within the socket 26, is adapted to be grasped by a holder means 40 of a releasable drawback mechanism 42 for the purpose of retaining the tool holder 28 within the socket 26 of the spindle 15. The releasable drawback mechanism includes a drawbar member or rod 43 which is reciprocable in an axial bore 44 in the spindle 15. The draw rod 43 has a projecting shaft portion 45 on its forward end which terminates in an enlarged drive head 46 to provide a rearwardly facing shoulder 47 adjacent the inner side of the head 46 and which is received in the holder means 40.

The holder means 40 is a collet type device which slides within a sleeve 49 in the spindle and is readily contractible and expandable to enable it to lock and release the plug 37 of the tool holder 28. The holder means 40 comprises a plurality of locking elements 50 extending axially of the spindle and arranged annularly in the sleeve 49 about the drive head 46 of the drawback mechanism. The locking elements 50 are held in assembled relationship and are biased to a contracted or a closed position by garter springs 51, 52 at the forward and rearward ends respectively of the locking elements 50. The garter springs encircle the locking elements and are received in notches in the elements.

When the holder means is in a position within the sleeve 49, the holder means is prevented from opening by the engagement of projecting portions 53, 54 with the inside wall of the sleeve 49. The projections 53, 54 are spaced by a recessed portion and are located respectively at the forward and rearward ends of each of the locking elements 50.

The elements 50 also have inwardly projecting finger portions 58 at their forward ends which provide a forward cam surface 60 that tapers rearwardly and inwardly from the forward end of the collet and terminates in an axially extending surface 61 which extends axially rearwardly from the tapered surface 60 and which in turn terminates in a tapered rear cam surface 62 which tapers rearwardly and away from the spindle axis. The rear cam surfaces 62 are adapted to engage a complementary surface 63 on the plug 37 to hold the tool arbor in the socket when the holder means 40 is disposed within the sleeve 49. The tool arbor and the holder means 40 are prevented from moving forwardly out of the sleeve 49 by the engagement of inwardly extending portions 65 on the locking elements 50 at the rearward ends thereof. The inwardly projecting portions 65 engage the rear side 47 of the drive head 46 on the drawback rod and since the drawback rod is locked against outward movement, the collet device and the tool arbor are also locked tight against outward movement.

Figure 4:
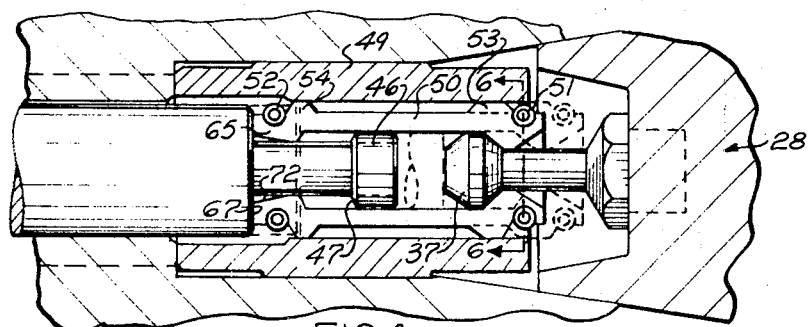
FIG. 4 is an enlarged fragmentary view of a portion of FIG. 3 but showing the draw rod in a different position.
Figure 5:
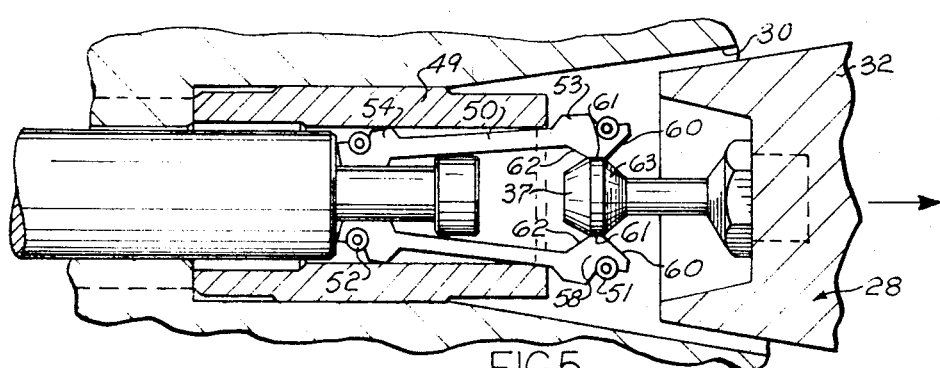
FIG. 5 is a cross-sectional view corresponding to FIG. 4 but showing the tool holder being withdrawn from the spindle.
Figure 6:
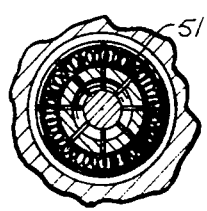
FIG. 6 is a cross-sectional view taken approximately along line 6—6 of FIG. 4.

When the tool arbor is to be unseated from the tool socket and released, the drawback rod 43 is moved forwardly until the inner end of the rod, designated by the reference numeral 67, engages the rearward end of the collet device to cause the collet device to move forwardly to position the forward end of the collet outwardly of the sleeve 49 in a position where the outwardly projecting portions 53 of the locking elements will clear the forward end of the sleeve 49 to allow the forward end of the collet device to be radially expanded. This position is shown in dot-dash lines in FIG. 4.

During the final portion of the movement of the collet device to its forward release position, the forward end of the drive head 46 engages the rearward end of the adaptor plug 37 and unseats the tool from the socket 26. Inasmuch as the tool arbor, collet device 40, and drawbar 43 are moving as a unit at this time, there is no tendency to move the tool arbor or the adaptor plug relative to the collet device 40 and the collet device will maintain its grip on the adaptor plug 37 and in turn on the tool arbor since the garter spring 51 maintains the fingers in a closed position. After the tool has been unseated and the movement to the forward release position has been completed, the tool can be withdrawn by forceably pulling the tool arbor from the socket. The tapered portion 63 of the plug 37 will act on the mating sides 62 of the inwardly extending finger portions to cam open the forward end of the locking elements to release the tool arbor.

As the plug 37 clears the locking elements, the garter spring 51 biases the finger elements to a closed position to await the reception of the next tool.

When the next tool is inserted into the spindle socket, the tapered leading end of the plug 37 engages the forward cam surface 60 of the finger portions to expand the forward end of the collet device to allow the plug 37 to clear the finger portions 58 and to be received within the collet device. The collet device will not be pushed rearwardly by the tool arbor as it is inserted because the drawbar rod 43 is in engagement with the rear end of the locking elements. After the arbor has been inserted so that the plug 37 is within the collet mechanism and in engagement with the drive head on the drawbar, the locking elements will be closed by the spring 51 and operation of the drawbar 43 rearwardly will cause the rear side of the driving head 46 to engage, after lost motion movement, the inwardly projecting portions 65 at the rear of the finger elements to move the collet device into the sleeve 49.

The rearward sides on the outwardly projecting portions 53 of the finger elements are tapered to provide a cam surface which cooperates with a bevel at the forward end of the sleeve 49 to cam the finger portions to a fully closed position in the event that the plug 37 has not been inserted far enough to allow the garter springs to fully close the fingers. When the drawbar mechanism has completed its stroke, it has drawn the tool arbor into the socket and positioned the collet device within the sleeve 49 so that it cannot expand.

As is illustrated in FIG. 2, the drawbar 43 is reciprocated by a fluid pressure actuator 70 between its release and locking positions. The actuator is preferably such that the fluid holds the motor in a limit position when it is not operating so that the collet device will be held in its locking position when it is holding a tool and in its forward releasing position when it is awaiting a tool. This may be accomplished by trapping the fluid in the actuator in a conventional manner when the actuator is in a limit position.

As the forward end of the collet device is opened and closed upon the insertion or withdrawal of the tube of a tool arbor, the rearward end of the finger elements rock on the projecting portion 45 of the drawbar and the inwardly extending portions 65 are tapered at 72 to accommodate this rocking movement.

In the illustrated machine, the tool arbor has a gear portion 80 which meshes with cooperating gear teeth carried by the rotatable spindle to provide a drive from the spindle to the tool arbor. It will be understood that any conventional drive between the spindle and the tool arbor may be utilized.

The machine illustrated in FIG. 1 includes a tool changing mechanism which may comprise a rotatable arm 81 having a gripping device 82 associated therewith for gripping a flange on the tool holder. The arm may be swung to cause the gripping device to engage the flange to grip the tool holder, and after the tool holder is released and the spindle withdrawn to swing the tool holder to a position clear of the spindle to a position where the arm may receive a new tool to be moved into position in alignment with the spindle axis so that the tool holder can be inserted by moving the spindle axially to engage the tool holder. Since this tool changing mechanism does not form a part of my invention, it has not been shown or described in detail.

It can now be seen that the present invention provides a machine tool spindle with a new and improved tool drawback mechanism which is simple and so constructed and arranged that there is little danger of dropping a tool when the arbor is unseated by the mechanism.

What is claimed is:

1. In a machine tool having a tool spindle into which a tool holder is to be inserted, a mechanism comprising a collet device movable axially in said spindle for receiving and gripping a tool holder to be seated in the spindle, said collet device comprising a plurality of locking elements operable in a closed position thereof to hold a tool holder in said spindle and expandable apart from each other to accommodate the insertion or release of a tool holder, and resilient means urging said locking elements to said closed position independent of the position of the locking elements axially of the tool spindle, means for moving said collet device axially of the spindle between a forward position in which said locking elements are expandable apart against the urging of said resilient means for receiving or releasing a tool holder and a rearward position to seat a tool in said spindle, and means in said spindle for preventing said locking elements from being expanded apart when said collet device is in said rearward position.

2. In a machine tool, a mechanism according to claim 1 wherein said locking elements extend generally parallel to the spindle axis, and said resilient means comprises spring means encircling said locking elements.

3. In a machine tool, a mechanism according to claim 2 wherein said spring means comprises a pair of springs which respectively encircle said locking elements at the opposite ends thereof.

4. In a machine tool, a mechanism according to claim 3 wherein each of said springs is a garter spring.

5. A mechanism according to claim 1, wherein said locking elements extend generally parallel to the spindle axis and are arranged annularly about the spindle axis, said locking elements have inwardly-extending portions adjacent their front ends for gripping engagement with a stem portion on the tool holder and for transverse abutting engagement with an enlargement behind said stem portion when said locking elements are retracted rearwardly, and said resilient means comprises spring means urging said locking elements radially inward toward each other to maintain said inwardly-extending portions thereof in gripping engagement with said stem portion as said locking elements are advanced forwardly with respect to the tool holder.

6. A mechanism according to claim 1, wherein said means for moving the collet device comprises a drawbar having a forwardly-facing shoulder for engagement with the back ends of said locking elements when the drawbar is displaced forwardly, a reduced extending centrally between said locking elements, and an enlarged head at the front of said extension, and said locking elements have inwardly projecting portions disposed behind said enlarged head for abutting engagement by the back of said head when the drawbar is retracted rearwardly.

7. In a machine tool having a tool spindle with a socket into which a tool holder is to be inserted, a collet and drawbar mechanism comprising:

a collet device having an annular group of locking elements, each extending longitudinally of the spindle socket, said group of locking elements being slidable longitudinally of the spindle socket, spring means urging said locking elements together to a closed position for engaging a tool holder, said locking elements being expandable apart against the urging of said spring means to release the tool holder when positioned forwardly along the spindle socket, and means rigidly constraining said locking elements against movement apart when positioned rearwardly along the spindle socket;

and a drawbar having a forwardly-projecting reduced extension extending between said locking elements and cooperable therewith to retract the locking elements rearwardly when the drawbar is retracted rearwardly, said drawbar having a forwardly-facing shoulder behind said extension which is engageable with the back ends of said locking elements to push the locking elements forward along the spindle socket when the drawbar is moved forward while said spring means maintains said locking elements together in their closed position engaging the tool holder.

8. A mechanism according to claim 7, wherein said locking elements have inwardly-projecting portions with rearwardly-facing surfaces for engagement with the front of an enlargement on the tool holder for retracting the tool holder into the spindle socket when said locking elements are retracted rearwardly, and said sping means comprises a constricting spring which encircles said locking elements forwardly of said rearwardly-facing surfaces on said inwardly-projecting portions.

9. A mechanism according to claim 8, wherein said drawbar extension has an enlargement spaced forward from said shoulder, and said locking elements have inwardly-projecting portions with forwardly-facing surfaces for engagement by the back of said enlargement on said drawbar extension for retraction of the locking elements rearwardly with the drawbar, and further comprising constricting spring means encircling said locking elements rearwardly of said forwardly-facing surfaces on said last-mentioned inwardly-projecting portions of the locking elements.

10. A mechanism according to claim 9, wherein said enlargement on the drawbar extension is spaced forwardly from said last-mentioned inwardly-projecting portions of the locking elements when said forwardly-facing shoulder on the drawbar engages the back ends of the locking elements.

11. A mechanism according to claim 7, wherein said drawbar is operatively coupled to said locking elements for lost-motion movement with respect thereto in its forward and rearward movements.

References Cited

UNITED STATES PATENTS

| 1,807,265 | 5/1931 | Walker | 90—11.1 X |
| 2,631,872 | 3/1953 | Würmser | 279—49 X |
| 2,860,547 | 11/1958 | Stephan | 90—11.1 |
| 3,177,775 | 4/1965 | Alisauskis | 90—11.1 |
| 3,333,511 | 8/1967 | Schoepe | 77—3 X |

ANDREW R. JUHASZ, Primary Examiner

G. WEIDENFELD, Assistant Examiner

U.S. Cl. X.R.

279—49

PO-1050
(5/69)

UNITED STATES PATENT OFFICE
CERTIFICATE OF CORRECTION

Patent No. 3,474,705          Dated  October 28, 1969

Inventor(s)  Harry J. Jacob, Jr.

It is certified that error appears in the above-identified patent and that said Letters Patent are hereby corrected as shown below:

In the claims:

Column 5, line 70, after "reduced" insert --extension--

SIGNED AND
SEALED
FEB 17 1970

(SEAL)
Attest:

Edward M. Fletcher, Jr.
Attesting Officer

WILLIAM E. SCHUYLER, JR.
Commissioner of Patents